United States Patent
Spice

(10) Patent No.: US 10,740,741 B2
(45) Date of Patent: Aug. 11, 2020

(54) CONTACTLESS PAYMENT TERMINAL

(71) Applicant: Richard Spice, Dorking Surrey (GB)

(72) Inventor: Richard Spice, Dorking Surrey (GB)

( * ) Notice: Subject to any disclaimer, the term of this patent is extended or adjusted under 35 U.S.C. 154(b) by 194 days.

(21) Appl. No.: 15/566,738

(22) PCT Filed: Apr. 15, 2016

(86) PCT No.: PCT/GB2016/051061
§ 371 (c)(1),
(2) Date: Oct. 16, 2017

(87) PCT Pub. No.: WO2016/166552
PCT Pub. Date: Oct. 20, 2016

(65) Prior Publication Data
US 2018/0121900 A1    May 3, 2018

(30) Foreign Application Priority Data
Apr. 15, 2015  (GB) .................................. 1506390.2

(51) Int. Cl.
*G06Q 20/00* (2012.01)
*G06Q 20/20* (2012.01)
(Continued)

(52) U.S. Cl.
CPC ....... *G06Q 20/204* (2013.01); *G06Q 20/3223* (2013.01); *G06Q 20/3278* (2013.01);
(Continued)

(58) Field of Classification Search
CPC .................... G06Q 20/204; G06Q 20/3278
(Continued)

(56) References Cited

U.S. PATENT DOCUMENTS 6,092,052 A   7/2000 Ziarno
6,230,028 B1  5/2001 Shirakawa
(Continued)

FOREIGN PATENT DOCUMENTS

JP   2001202482 A   7/2001
WO   2012154902 A1  11/2012
WO   WO-2013028646 A2 *  2/2013 ......... G06Q 30/0238

OTHER PUBLICATIONS

International Search Report and Written Opinion of the International Searching Authority, Application No. PCT/BG2016/051061, dated Jun. 6, 2016, 12 pages.
(Continued)

*Primary Examiner* — Rokib Masud
(74) *Attorney, Agent, or Firm* — Ziegler IP Law Group, LLC

(57) ABSTRACT

A payment terminal includes a contactless payment transceiver, a display, and user input apparatus with a select, increase and decrease input. The payment terminal will display an initial numerical value, and respond to an increase input by incrementing the numerical value; a decrease input by decrementing the numerical value; a select input by setting a transaction amount; and use the contactless payment transceiver to initiate execution of a transaction for the transaction amount with a contactless payment token. The user input apparatus includes an aspect movable to positions either side of a zero position and is mechanically biased to the zero position. The payment terminal can control the rate of incrementing and decrementing the numerical value depending on a detected amount of deflection of the aspect from the zero position.

16 Claims, 7 Drawing Sheets

(51) Int. Cl.
    *G06Q 20/32* (2012.01)
    *G07B 15/02* (2011.01)
    *G06Q 20/34* (2012.01)
    *G06Q 30/06* (2012.01)

(52) U.S. Cl.
    CPC ......... *G06Q 20/341* (2013.01); *G06Q 20/352* (2013.01); *G06Q 30/06* (2013.01); *G07B 15/02* (2013.01)

(58) Field of Classification Search
    USPC .......................................................... 705/17
    See application file for complete search history.

(56) References Cited

U.S. PATENT DOCUMENTS

| | | | |
|---|---|---|---|
| 2003/0006280 A1* | 1/2003 | Seita | G06K 7/0008 235/380 |
| 2007/0046655 A1 | 3/2007 | Bruno | |
| 2012/0081282 A1 | 4/2012 | Chin | |
| 2012/0172061 A1 | 7/2012 | Dods et al. | |
| 2013/0017790 A1* | 1/2013 | Oba | H04L 63/0492 455/41.2 |
| 2013/0048717 A1 | 2/2013 | Brendell et al. | |
| 2013/0273843 A1 | 10/2013 | Shimota et al. | |
| 2014/0061298 A1 | 3/2014 | Fasoli et al. | |
| 2014/0125591 A1* | 5/2014 | Sawai | G06F 3/033 345/157 |
| 2014/0263625 A1 | 9/2014 | Smets et al. | |
| 2015/0046867 A1 | 2/2015 | Moore et al. | |
| 2015/0370469 A1* | 12/2015 | Leong | G06F 1/14 715/771 |

OTHER PUBLICATIONS

GB Intellectual Property Office Combined Search and Examination Report, Application No. GB1506390.2, dated Sep. 25, 2015, 6 pages.

* cited by examiner

CONTACTLESS PAYMENT TERMINAL

FIELD

The aspects of the disclosed embodiments generally relate to a mobile contactless payment terminal and a method of operating a mobile contactless payment terminal.

BACKGROUND OF THE INVENTION

Contactless payment is a convenient and secure method for consumers to make payment transactions for goods and services. Such payment transactions are becoming increasingly common. Currently in the UK, there is a spending cap when using contactless to make payments, primarily for security reasons such as to prevent fraudulent usage. The spending cap limit was recently increased to £30 from £20 and future further increases are likely.

Contactless payments can be made using a variety of contactless payment devices. Typically, debit or credit cards issued by banks or building societies come equipped with contactless payment chips (integrated circuits) to facilitate contactless payments. Other means of making contactless payments are also becoming increasingly common such contactless payment devices like key fobs, smartcards, smart watches, mobile phones and tablet computers. Mobile phones and tablets must have the correct hardware and software such that they can be configured to make contactless payments. Contactless payment devices include wireless transceivers.

In a typical merchant transaction, for example at a restaurant, a customer receives a bill at the end of a meal and submits a form of payment. Tips and gratuities are often incorporated into the main bill at the customer's discretion and paid in cash or with a payment card. Certain retailers have payment terminals which allow the customer to add tips and gratuities to the main bill when making a card payment. Typically, when making a payment, a payment terminal is presented to the customer comprising a keypad to allow the user to enter desired tip and gratuities and to confirm the payment transaction. When the desired amount has been confirmed, the customer can then proceed to make a payment using a PIN number entered into the keypad for authentication. Some payment terminals however do not offer such a feature and tips and gratuities must then be paid separately, which is usually possible only using cash.

Furthermore, outside of the retail environment, for instance when interacting with charitable organisations, donors are often presented with a number of means to donate money. Typically, charitable organisations accept donations in cash, debit or credit card donations over the phone, text donations, internet donations or contactless donations as well. For contactless donations, donors may be given the option to donate a preset amount of, for instance, £3, £5 or £10. For charity personnel collecting donations on behalf of charity organisations in public areas, often, a donor is only presented with the option to pay by cash only.

WO2012/154902 and US2007/046655 disclose parking meters with user interfaces by which a user can set a price to pay using up and down inputs. The possible payment amounts in these devices are limited to a small number of options. For some other reasons also they are not well-suited to service tipping and charity donation applications.

SUMMARY

A first aspect of the disclosed embodiments provide a payment terminal comprising, a contactless payment transceiver;
a display; and
user input apparatus comprising a select input, an increase input and a decrease input,
wherein the payment terminal is configured to
display an initial numerical value;
respond to detecting user operation of the increase input by incrementing the numerical value displayed on the display;
respond to detecting user operation of the decrease input by decrementing the numerical value displayed on the display;
respond to detection of user operation of the select input by setting a transaction amount that corresponds to the numerical value displayed on the display at the time of detection of user operation of the select input; and
use the contactless payment transceiver to initiate execution of a transaction for the transaction amount with a contactless payment token.

The user input apparatus may comprise an input device having an aspect that can be moved by a user to positions either side of a zero position, and wherein the increase input and the decrease input comprise means for detecting deflection of the aspect from the zero position in different directions respectively.

The aspect of the input device may be mechanically biased to the zero position such that the aspect of the input device returns to the zero position in the absence of applied force.

The payment terminal may be configured to control the rate of incrementing and decrementing the numerical value depending on a detected amount of deflection of the aspect of the input device from the zero position.

The input device may comprise a dial device that can be rotated by a user in clockwise and anticlockwise directions around a zero position, and wherein the increase input and the decrease input comprise means for detecting deflection of the dial from the zero position in different directions respectively.

The increase input may comprise means for detecting deflection of the dial from the zero position in the clockwise direction and the decrease input comprises means for detecting deflection of the dial from the zero position in the anticlockwise direction.

The select input may comprise means for detecting displacement of the dial in a direction that is substantially perpendicular to the plane of rotation of the dial.

The dial device may have a textured outer surface.
The dial device may have a rubberised outer surface.
The aspect may comprise a slider that can be moved by a user to positions either side of the zero position, and wherein the increase input and the decrease input comprise means for detecting deflection of the slider from the zero position in different directions respectively.

The increase input and the decrease input may comprise touch-sensitive switches.

The increase input and the decrease input may comprise push-operated electrical switches.

The second aspect of the disclosed embodiments provide a method of operating a payment terminal,
the payment terminal comprising: a contactless payment transceiver; a display; and user input apparatus comprising a select input, an increase input and a decrease input,
wherein the method comprises:
displaying an initial numerical value;

responding to detecting user operation of the increase input by incrementing the numerical value displayed on the display;

responding to detecting user operation of the decrease input by decrementing the numerical value displayed on the display;

responding to detection of user operation of the select input by setting a transaction amount that corresponds to the numerical value displayed on the display at the time of detection of user operation of the select input; and using the contactless payment transceiver to initiate execution of a transaction for the transaction amount with a contactless payment token.

A third aspect of the disclosed embodiments provide a payment terminal comprising:

a contactless payment transceiver;

a display; and user input apparatus comprising a select input, an increase input and a decrease input, wherein the payment terminal is configured to:

display an initial numerical value;

respond to detecting user operation of the increase input by incrementing the numerical value displayed on the display;

respond to detecting user operation of the decrease input by decrementing the numerical value displayed on the display;

respond to detection of user operation of the select input by setting a transaction amount that corresponds to the numerical value displayed on the display at the time of detection of user operation of the select input; and use the contactless payment transceiver to initiate execution of a transaction for the transaction amount with a contactless payment token, wherein the user input apparatus comprises an input device having an aspect that can be moved by a user to positions either side of a zero position and is mechanically biased to the zero position such that the aspect of the input device returns to the zero position in the absence of applied force, and wherein the payment terminal is configured to control the rate of incrementing and decrementing the numerical value depending on a detected amount of deflection of the aspect of the input device from the zero position.

DETAILED DESCRIPTION

Figure 1:
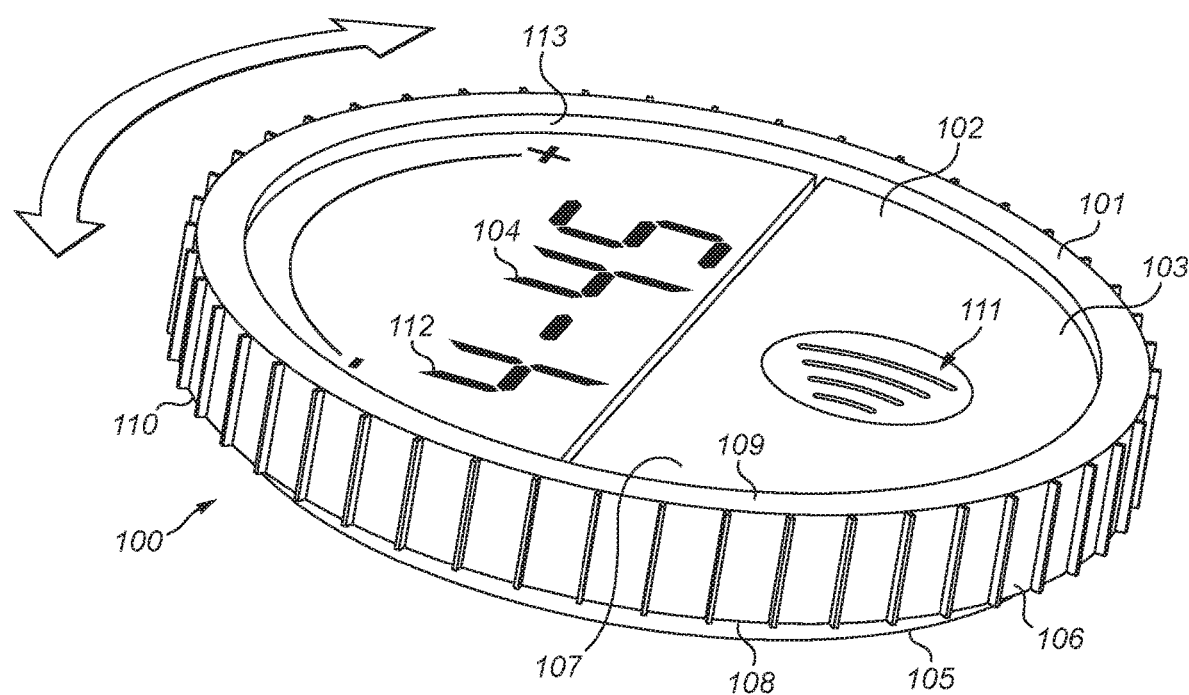
FIG. 1 is an isometric view of a mobile payment terminal according to embodiments of the present disclosure.

In the following, embodiments of the present disclosure will be described with reference to a mobile payment terminal 100 being used in a retail environment, for instance a restaurant for accepting tips or gratuities and for making charity donations. The present invention is however not limited to such applications and may be equally deployed in other environments that permit contactless payment to be made.

In brief, this specification discloses a mobile payment terminal for use in making quick and convenient contactless payments or charity donations, whereby the payer can quickly and easily select a desired payment amount before making a contactless payment. This is a new class of payment terminal that does not have correspondence at present.

Increasingly, consumers are choosing to pay for goods or services such as meal deliveries, taxi or minicab fares etc. online, using mobile apps, through websites, or over the phone. This often results in payments being made for the goods or services prior to their delivery. As such, upon delivery of the goods or services, the consumer wishing to tip the vendor may only do so by cash, if cash tipping is an option. This tipping option can pose inconvenience to the consumer as he or she may not always have (the right amount of) cash readily at hand. The new mobile payment terminal can be deployed in this case to allow the consumer an alternative means of tipping the deliverer of the goods or services.

For example, the payment terminal may be deployed in a food/beverage environment for instance a restaurant or café on each serving table to allow a customer an alternative means to quickly and conveniently make tips and gratuities payments for an amount of his or her choice using a contactless payment device or token. The mobile payment terminal can also be deployed by charitable organisations to enable donors to make a donation for an amount of their choice using contactless payment.

The payment facility provided by the mobile payment terminal is "quick" in that the actual payment transaction is simple and intuitive, requiring minimum user interaction.

The mobile payment terminal may comprise only two user input means, a scrollable dial to allow the user to set a desired payment amount and a contactless payment interface. No keypad or other complicated control interface is necessary. The payment service provided is also "convenient" in that the mobile payment terminals are designed specifically for large scale deployment and are hence easily assessable to consumers in public spaces where payment transactions such as tipping and donations often take place.

In one embodiment, the user interface of the mobile payment terminal is very simple comprising only a scrollable dial for setting a desired payment amount, a display for displaying information to the user and a contactless payment interface. Another advantage of the mobile payment terminal is that it is a standalone and self-contained device that is readily portable. This feature is particularly useful in a retail environment such as a restaurant where the mobile payment terminal may be moved from table to table. The mobile payment terminal can also support multiple terminal usage. For instance, a busy restaurant may have several customers wanting to make payment at the same time. In this situation, a number of mobile payment terminals can be deployed at the same time within the same vicinity to carry out these payment transactions. The mobility and multiple usage functions of the mobile payment terminal are also particularly advantageous when deployed by personnel representing charitable organisations collect donations in public places.

Figure 2:
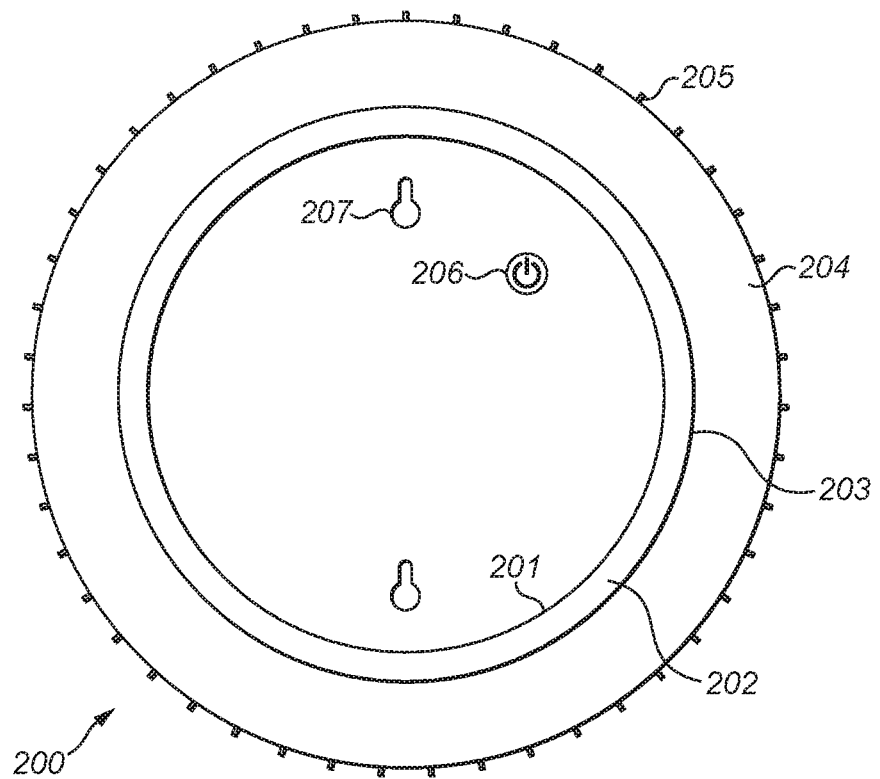
FIG. 2 is a bottom view of the FIG. 1 mobile payment terminal.

FIGS. 1 and 2 are views of a mobile payment terminal 100 according to embodiments of the present invention. The mobile payment terminal 100 comprises a circular main housing 102, a scrollable dial 101 and a supporting base 105. The circular main housing 102 comprises a top facing portion 107 and a bottom facing portion 108. The top facing portion 107 of the circular main housing 102 comprises two sections; a first section comprising a terminal display interface 104, and a second section comprising a short distance contactless radio frequency interface 103.

The scrollable dial 101 comprises a cylindrical ring with an outwardly facing surface 106, a top surface 109, and a bottom surface 110. The scrollable dial 101 embraces the periphery of the circular main housing 102 such that the top surface 109 stands proud 113 of the circular main housing 102 top facing portion 107. The outer surface 106 of the scrollable dial 101 is provided with features that allow easy gripping. In particular, the scrollable dial 101 may be textured, gnarled and/or coated with or formed of a rubberised material. The scrollable dial 101 embraces snugly to the periphery of the circular main housing 102, but can nevertheless be rotated in a clockwise and/or an anticlockwise direction relative to the circular main housing 102, which is maintained stationary.

The scrollable dial 101 is biased such that, when the scrollable dial 101 is rotated in a clockwise and/or anticlockwise direction, upon release, the scrollable dial returns to its original position relative to the circular main housing 102. The scrollable dial 101 may comprise a resilient spring to provide variable reactive force when the scrollable dial 101 is rotated and to return the dial to its original position when released.

The scrollable dial 101 operates as a switch that detects and indicates deflection of the dial through rotation. A different output is provided depending on the direction of deflection, i.e. one output is provided if the dial is deflected clockwise from a zero position and a different output is provided if the dial is deflected anti clockwise from the zero position. Optionally, the output is dependent on the amount of deflection from the zero position. Thus, the extent of deflection by the user, as well as the direction of deflection by rotation, can be detected.

Alternatively, the scrollable dial 101 may not be biased to return to its original position upon its release after being rotated in a clockwise and/or anti-clockwise direction. In this case, the starting position of the scrollable dial is always the default zero position. A different output is provided depending on the direction of rotation, i.e. one output is provided if the dial is rotated clockwise from the zero position and a different output is provided if the dial is rotated anti clockwise from the zero position.

The sensitivity, i.e. the magnitude of the output, of the scrollable dial 101 above when rotated may also vary depending on a present payment amount. The present payment amount is the summed total of the outputs. For instance, when the scrollable dial 101 is rotated for the first time from zero, the sensitivity of the scrollable dial 101 may be set high. A deflection or rotation, depending on the type of scrollable dial 101, will result in a relatively small change in output being provided. As the present payment amount increases, the sensitivity of the scrollable dial 101 may be reduced as a function of the present payment amount so that further changes in deflection or rotation result in a greater change in the output. For instance, for changes of one unit (which may be detectable tactically through the dial) an increase in one pence or cent may be made for values between zero and ten pence or cents, with one unit changes then giving rise to changes of 5 pence or cents from ten pence or cents to fifty pence or cents. Thereafter, each unit may give rise to a change of ten pence or cents.

The scrollable dial 101 can also operate as a push button switch that can be reversibly depressed relative to the circular main housing 102, which is maintained stationary. The scrollable dial 101 can be depressed such that the top surface 109 of the scrollable dial 101 is flush against the circular main housing 102 top facing portion 107. Upon release of the scrollable dial 101, it returns to its original position such that the top surface 109 stands proud 113 of the circular main housing 102 top facing portion 107. The scrollable dial 101 may comprise a resilient spring to provide a reactive force when it is depressed such that it is biased to its original position.

The supporting base 105 comprises a cylindrical protrusion that extends from the bottom facing portion 108 of the circular main housing 102, spacing the bottom face 110 of the scrollable dial 101 and the bottom face of the main housing 108 from the surface upon which the mobile payment terminal 100 is resting. FIGS. 1 and 2 are schematic, and details of the physical arrangement are described below.

The mobile payment terminal 100 comprises a display, such as an LCD display 112, on the terminal display interface 104 for displaying information. The mobile payment terminal further comprises a payment transceiver, such as an RFID or NFC transceiver, for gathering information from a contactless payment token, via the short distance contactless radio frequency interface 103.

In an alternative embodiment, the top surface 109 of the scrollable dial 101 is flush against the circular main housing 102 top facing portion 107. The scrollable dial 101 and the circular main housing 102 form a single entity that can be operated as a push button switch. When depressed, the scrollable dial 101 and the circular main housing 102 extends as a single entity towards the supporting base 105. The circular main housing 102 may comprise a resilient spring to provide a reactive force when it is depressed such that it is biased to its original position. In this embodiment, the scrollable dial 101 may also be operated as a rotatable dial in the same manner as described above.

The mobile payment terminal 100 further comprises at least one user input means 206, for instance a terminal "power on" push button, illustrated schematically as a button type switch. The scrollable dial 101 and/or the scrollable dial 101 and the circular main body 107 as a single entity, also comprises user input means. These user input means allow a user to trigger actions and optionally to turn on/off mobile payment terminal 100. The user input means may comprise a bias-type push switch, a touch sensitive switch, a scrollable dial, a slider-type switch, a capacitive sensor or some other means for detecting a user touch or proximity input.

The mobile payment terminal 100 is portable. It can be operated in a horizontal position as in FIG. 1 such that the top facing portion 107 of the circular main housing 102 is facing upwards. Alternatively, the mobile payment terminal 100 may be affixed to a flat surface using temporary means, for instance with strong magnets, located at the bottom facing portion 108 of the mobile payment terminal 100. The mobile payment terminal can be operated in any orientation, for instance in a vertical position such that the top facing portion 107 of the circular main housing 102 is facing sideways. Alternatively, the mobile payment terminal 100 may also be affixed to a substantially flat surface using more permanent means such as screws and/or hooks.

Figure 3:
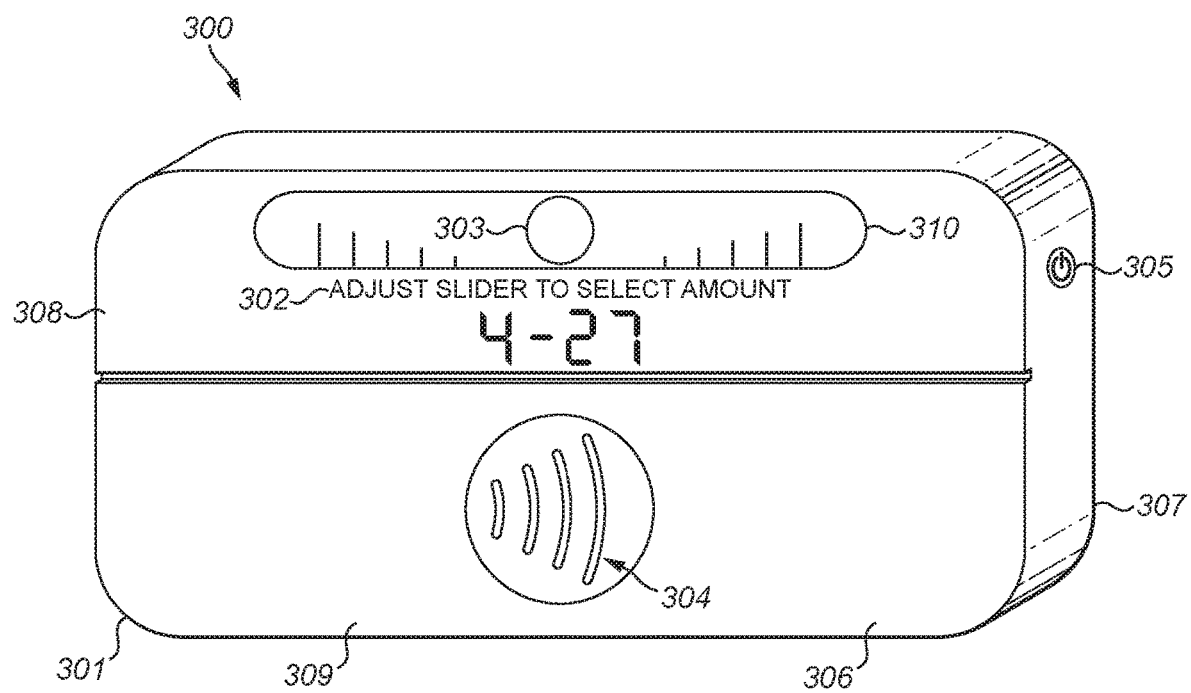
FIG. 3 is an isometric view of another mobile payment terminal according to embodiments of the present disclosure.

FIG. 3 is a perspective view of a second embodiment of the mobile payment terminal 100. Mobile payment terminal 300 comprises a rectangular main housing 301, comprising a top facing portion 306 and a bottom facing portion 307. The top facing portion 306 of the main housing 301 comprises two sections, a first section comprising a terminal display interface 308, and a second section comprising a short distance contactless radio frequency interface 309. The top facing portion 306 also comprises a multi-function sliding switch 310. The multi-function sliding switch 310 comprises a sliding knob 303 that can be manipulated along a track from side to side. The sliding knob 303 also operates as a push-type switch.

The sliding switch 310 operates as a switch that detects and indicates deflection of the slider linearly. A different output is provided depending on the amount of deflection. The sliding switch may have a zero position, and may be biased to the zero position such that the slider resides at the zero position in the absence of any applied force. A different output is provided by the slider switch 310 depending on the direction of deflection, i.e. one output is provided if the slider is deflected left from the zero position and a different output is provided if the dial is deflected right from the zero position. Optionally, the output is dependent on the amount of deflection from the zero position. Thus, the extent of deflection by the user, as well as the direction of linear deflection, can be detected. Alternatively, the slider switch 310 may not be biased and may serve to provide an output that indicates deflection from any reference position.

Alternatively, the sliding switch 310 may also be a continuous, touch sensitive circular slide bar in the shape of a ring. In the centre of the ring is a push-type switch.

The mobile payment terminal 300 comprises a display, such as an LCD display 302, on the terminal display interface 308, for displaying information. The mobile payment terminal further comprises sensors, such as RFID or NFC sensors, for gathering information from an external device contactless payment token, via the short distance contactless radio frequency interface 309.

The mobile payment terminal 300 further comprises at least one user input means 305, illustrated schematically as a push-type button switch. The multi-function sliding switch 310 also comprises user input means, illustrated schematically as a slider-type switch. These user input means allow a user to turn on/off mobile payment terminal 300 and/or to trigger actions.

The mobile payment terminal 300 is portable. It can be operated in a vertical position as in FIG. 3 such that the top facing portion 306 of the rectangular main housing 301 is facing sideways. Alternatively, the mobile payment terminal 300 may be affixed to a flat surface using temporary means, for instance with strong magnets, located at the bottom facing portion 307 of the mobile payment terminal 300. The mobile payment terminal 300 can be operated in any orientation, for instance in a horizontal position such that the top facing portion 306 of the rectangular main housing 301 is facing upwards. Alternatively, the mobile payment terminal 300 may also be affixed to a substantially flat surface using more permanent means such as screws and/or hooks.

Figure 4:
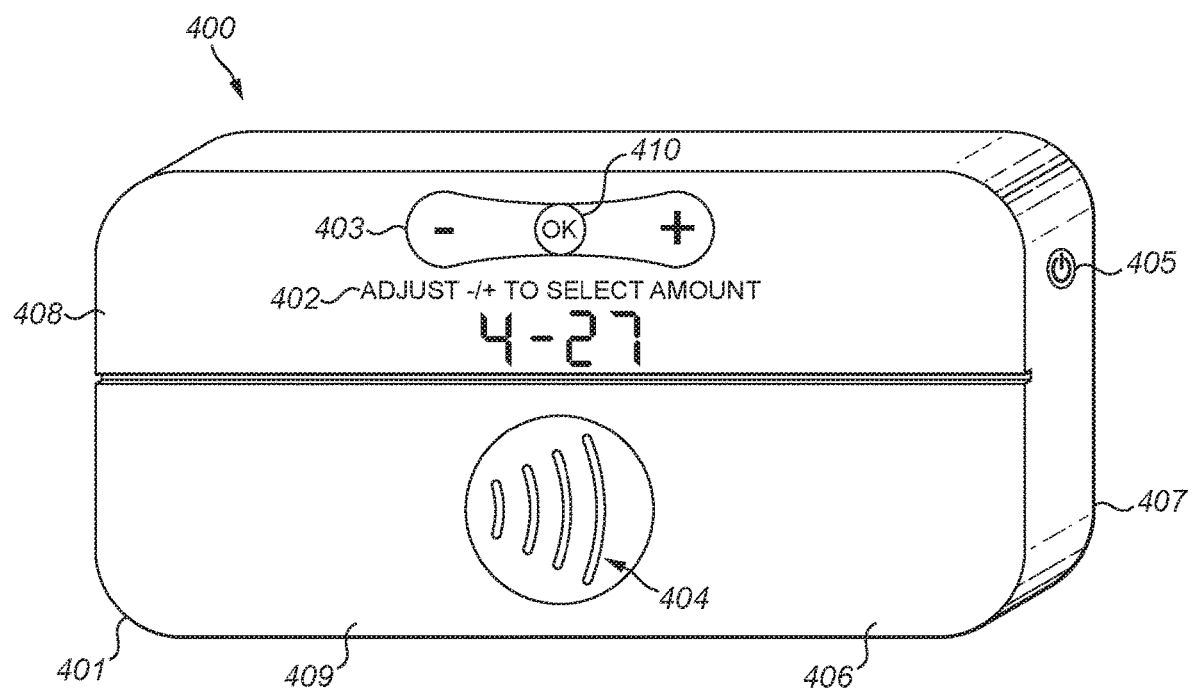
FIG. 4 is an isometric view of still a further mobile payment terminal according to embodiments of the present disclosure.

FIG. 4 is a perspective view of a third embodiment of a mobile payment terminal 100. Mobile payment terminal 400 comprises a rectangular main housing 401, comprising a top facing portion 406 and a bottom facing portion 407. The top facing portion 406 of the main housing 401 comprises two sections, a first section comprising a terminal display interface 408, and a second section comprising a short distance contactless radio frequency interface 409.

The mobile payment terminal 100 also comprises a multi-function button adjuster 403. This is provided on the top facing portion 406 on this example. The multi-function adjuster 403 comprises a "plus" and a "minus" input means, and a confirmation "OK" input means 410 in between. These input means may be any suitable type of switch or device, for instance each may comprise a bias-type push switch, a touch sensitive switch, a scrollable dial, a slider-type switch, a capacitive sensor or some other means for detecting a user touch or proximity input.

The mobile payment terminal 400 comprises an LCD display 402 on the terminal display interface 408 for displaying information. The mobile payment terminal further comprises sensors, such as RFID or NFC sensors, for gathering information from an external payment token via the short distance contactless radio frequency interface 409.

The mobile payment terminal 400 further comprises at least one user input means 405, illustrated schematically as a button type switch. The multi-function adjuster 403 also comprises user input means, illustrated schematically as a cluster of bias-type buttons. These user input means allow a user to turn on/off the mobile payment terminal 400 and/or to trigger actions.

The mobile payment terminal 400 is portable. It can be operated in a vertical position as in FIG. 4 such that the top facing portion 406 of the rectangular main housing 401 is facing sideways. Alternatively, the mobile payment terminal 400 may be affixed to a flat surface using temporary means, for instance with strong magnets, located at the bottom facing portion 407 of the mobile payment terminal 400. The mobile payment terminal 400 can be operated in any orientation, for instance in a horizontal position such that the top facing portion 406 of the rectangular main housing 401 is facing upwards. Alternatively, the mobile payment terminal 400 may also be affixed to a substantially flat surface using more permanent means such as screws and/or hooks.

Figure 5:
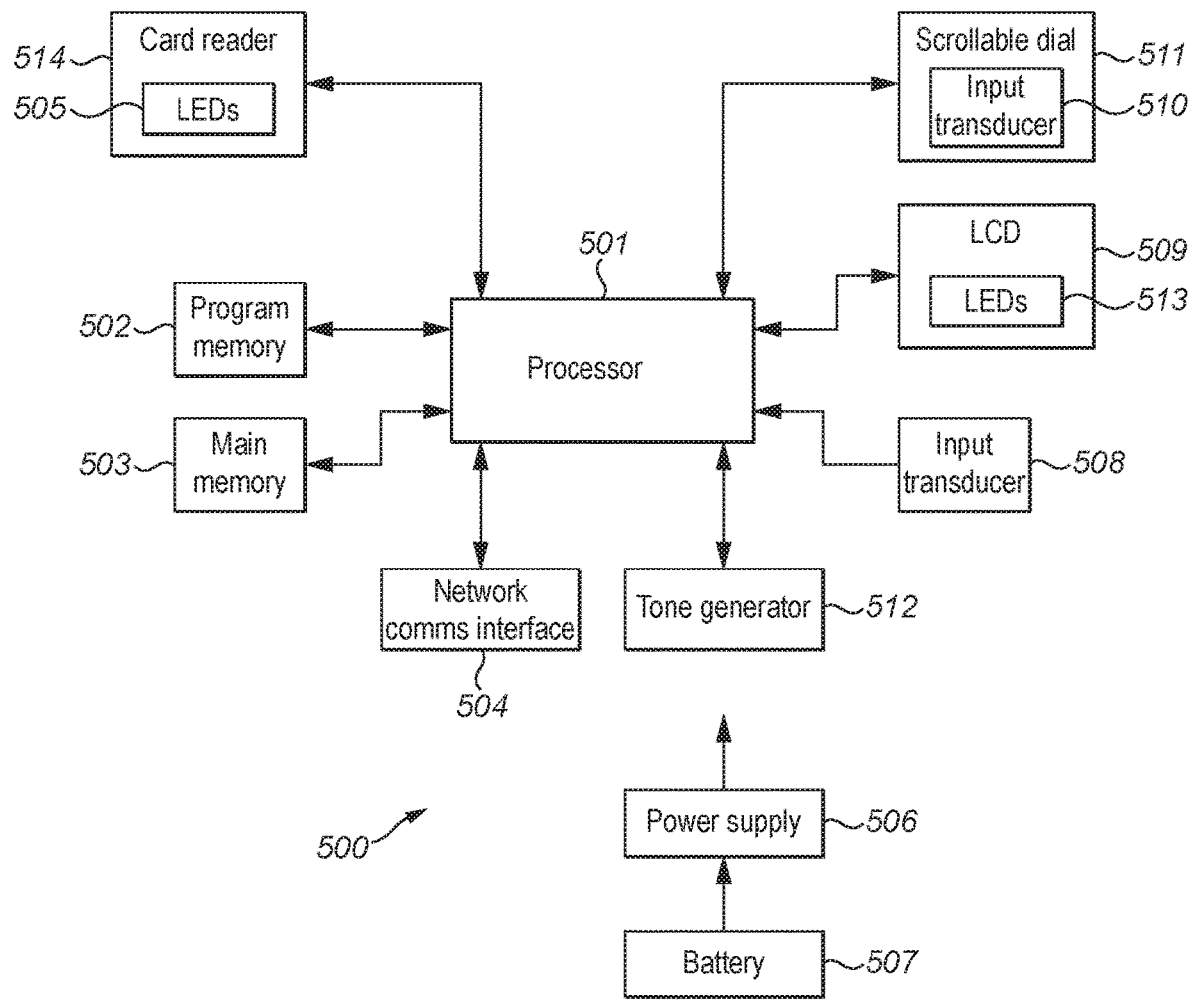
FIG. 5 is a schematic view of the FIG. 1 mobile payment terminal and showing internal components of the device.

FIG. 5 is a schematic view of components forming the mobile payment terminal 100 of FIGS. 1 and 2 or the terminal 300, or the terminal 400. Within the circular main housing 102 of the mobile payment terminal 100, a plurality of components is contained. These components are controlled by a processor 501 which may for instance be a microprocessor, a Digital Signal Processor (DSP), Application Specific Integrated Circuit (ASIC), Field Programmable Gate Array (FPGA) or the like. Processor 501 executes program code (e.g. software or firmware) stored in a program memory 502. It uses a main memory 503, to execute the program code and to store intermediate results. Program memory 502 may for instance be a Read-Only Memory (ROM) or Flash memory, and main memory 503 may for instance be a Random Access Memory (RAM) or Flash memory.

In embodiments such as those shown in FIGS. 1 to 4, the processor 501 interacts with a first input mean 508, via which the mobile payment terminal 100 may for instance be turned on and off. A second input mean 510 may be used to acknowledge information presented to a user of the mobile payment terminal 100. The scrollable dial 511 may also comprise input means used to transmit information to the mobile payment terminal 100.

Processor 501 controls a display 509, which is embodied as a Liquid Crystal Display (LCD). LCD 509 is used to display information to a user of the mobile payment terminal 100, for instance information on the present setting of a payment amount, and/or operating instructions, and/or any other information. Processor 501 may also control the illumination of the LCD 509 using one or more backlit light-sources such as coloured light emitting diodes LEDs 513 to convey information to the user. The mobile payment terminal 100 is thus capable of capturing information related to manipulation of the scrollable dial 511. This information is then displayed on the LCD 509 for use by the user of the device.

Processor 501 also controls a payment token or payment card reader 514 located within the housing of the short distance contactless radio frequency interface 103. The card reader 514 is configured to communicate relevant information with a contactless payment device or token, for instance a chip-and-pin payment card, or a compatible mobile phone or tablet, or any other contactless payment devices. The relevant information received from the contactless payment device is stored in the main memory 503 of the mobile payment terminal 100 to be processed at a later time.

Processor 501 also controls one or more light-sources such as light emitting diodes LEDs 505 to illuminate a contactless payment indicator logo 111 located on the housing of the short distance contactless radio frequency interface 103. The processor 501 may control the one or more LEDs 505 to flash intermittently. The contactless payment indicator logo 111 may comprise a diffuser in front of the light-sources, for instance a diffuser made from a piece of acrylic glass or polycarbonate.

Processor 501 also controls a tone generator 512 to emit a tone within the housing of the short distance contactless radio frequency interface 103. The processor 501 may control the mobile payment terminal 100 tone generator 512 to emit one or more tones at anytime during the operation of the mobile payment terminal 100. This is used to provide audio cues to the user of a transaction between the mobile payment terminal 100 and the user.

Processor 501 also controls a network communications interface 504 to connect with another device, for instance an acquirer owned terminal not shown in FIG. 5. When the processor 501 communicates with another device such as the acquirer owned terminal, digital information such as payment transaction information is transferred from the mobile payment terminal 100 to the acquirer owned terminal for further processing. The mobile payment terminal 100 processor 501 can also receive digital information from the acquirer owned device via the interface 504. The interface 504 may operate according to a mobile telephony communications protocol.

Figures 6, 7:
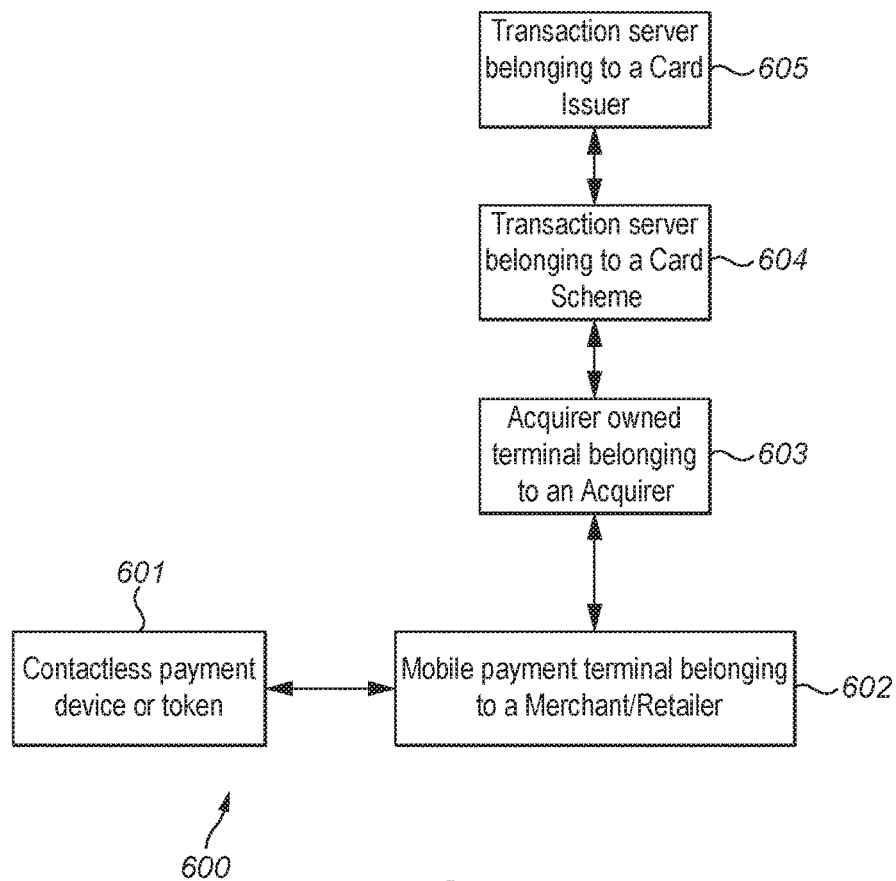
FIG. 6 shows a number of stakeholders participating in a contactless payment transaction and how the payment transaction is processed.
FIG. 7 is a table showing different operating states of the FIG. 1 mobile payment terminal.

FIG. 6 is a high-level system overview, showing a number of stakeholders participating in a contactless payment transaction and how a contactless payment transaction is processed. In FIG. 6, there are a total of five stakeholders in the contactless payment transaction process namely, the owner of a contactless payment device or token 601, a merchant/retailer who owns a mobile payment terminal 602, an acquirer who owns an acquirer owned terminal 603, a card scheme who owns a transaction server 604 and a card issuer who also owns a transaction server 605.

The contactless payment device or token 601 is a contactless payment device, for instance a contactless debit card, or a mobile device or tablet configured as a contactless payment device.

The merchant/retailer in 602 is a goods and/or services provider to the owner of the contactless payment device holder or token 601, in this case a restaurant. The merchant/retailer 602 interacts directly with the contactless payment device 601 during a contactless payment transaction via the mobile payment terminal 100. The merchant/retailer 602 may also be a service provider or a charitable organisation.

The acquirer in 603 processes contactless payment transactions for the merchant/retailer in 602 under a pre-negotiated agreement between the merchant/retailer in 602 and the acquirer in 603. Depending on the agreement terms, the acquirer in 603 may provide an acquirer owned terminal used to perform part of the contactless payment transaction.

The card scheme in 604 (or payment processing network) is operated by an organisation that manages and controls the operation and clearing of a contactless payment device payment transaction according to pre-agreed rules via transaction servers. Some examples of card scheme organisations that operate worldwide are American Express, Diners Club, JCB, Maestro, MasterCard and Visa (including Electron and Debit).

The card issuer in 605 is a bank, building society or financial organisation that provides accounts to users and issues contactless payment devices such as debit or credit cards, e.g. the payment card device holders in 601. The card issuer in 605 is responsible for contactless payment transactions made on the contactless payment devices that they have issued, and is responsible for debiting funds from the relevant account via transaction servers.

The card scheme in 604 is responsible for passing the contactless payment transaction details from the acquirer 603 to the card issuer 605 and for passing payments back to the acquirer 603, which in turn pays the merchant/retailer 602 ideally in the usual manner of payment transactions.

The acquirer in 603 is responsible for receiving payment transaction details from the mobile payment terminal 100 via the acquirer owned terminal, passing this information through to the card issuer in 605 via the card scheme in 604 for authorisation and completing the processing of the payment transaction ideally in the usual manner of payment transactions.

FIG. 7 is a table showing the various operating states that the mobile payment terminal 100 can enter into. The mobile payment terminal 100 can be in four states. In State 1 702, the mobile payment terminal 100 is off. When turned on, the mobile payment terminal 100 can be in one of three states, i.e. States 2-4, depending on what task the mobile payment terminal 100 is performing in the contactless payment transaction process. Depending on what state the mobile payment terminal 100 is in, the terminal user interface 706 and the short distance contactless radio frequency interface 707 can be either on or off respectively as per table 700 in FIG. 7. The states will be discussed in further detail in the following sections.

Figure 8:
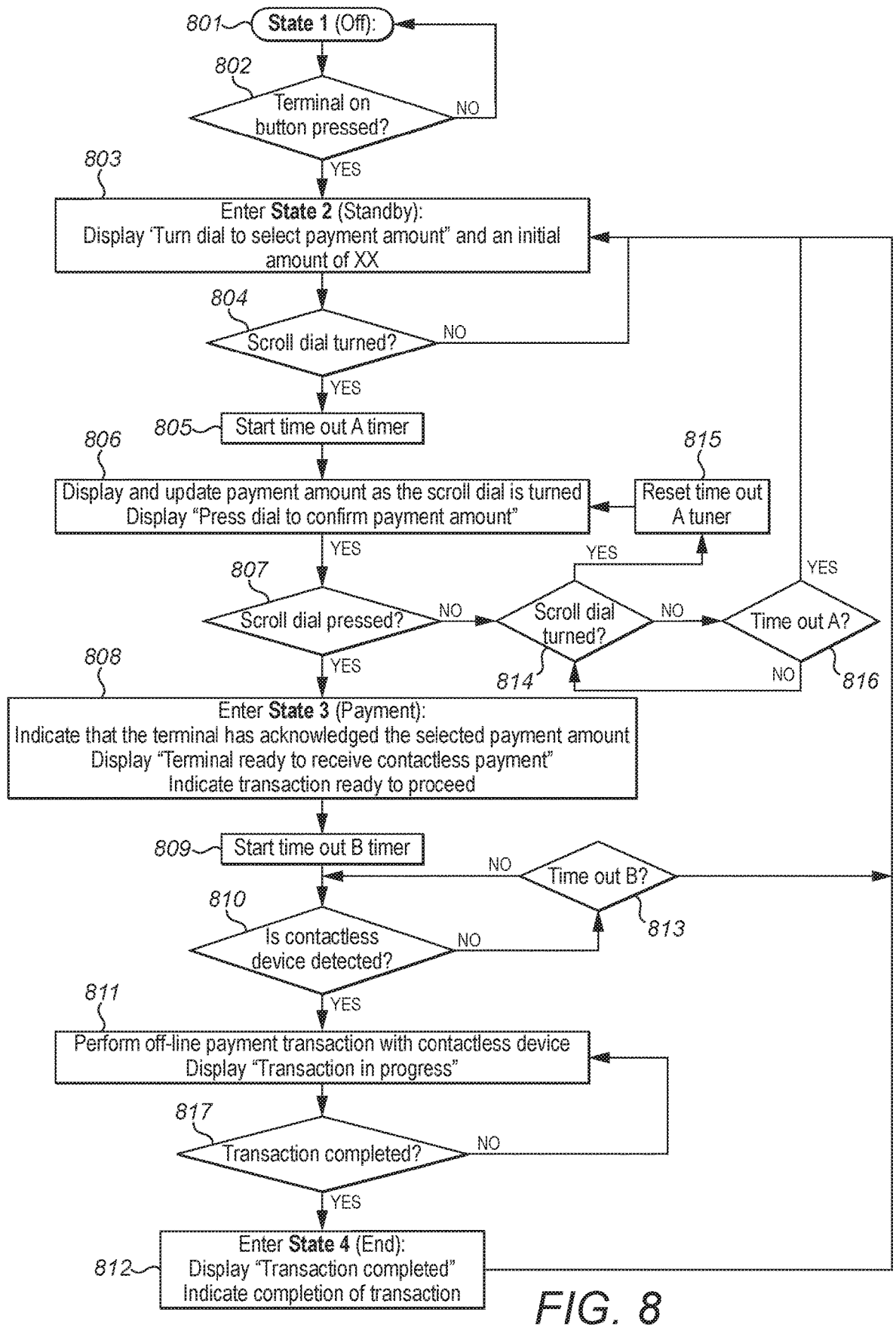
FIG. 8 is a flow chart showing the operation of the FIG. 1 mobile payment terminal according to embodiments of the present disclosure.
Figure 9:
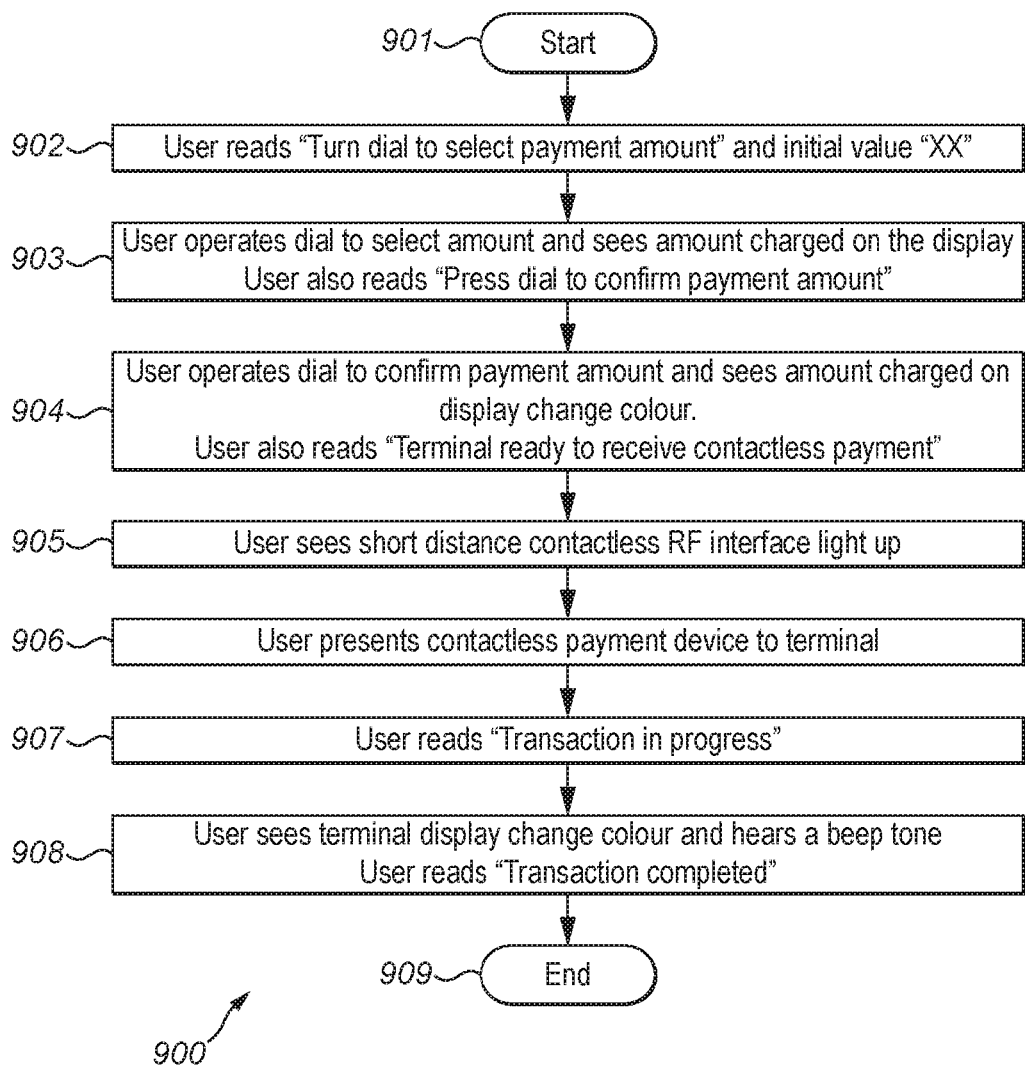
FIG. 9 is a flow chart showing the user experience of the FIG. 1 mobile payment terminal according to embodiments of the present disclosure.

FIG. 8 and FIG. 9 are flow charts illustrating the operation of the mobile payment device 100 and the user's experience respectively when a contactless payment transaction is made. The flow chart in FIG. 8 illustrates how the mobile payment terminal 100 interacts with the user and how it operates internally during a contactless payment transaction. The flow chart in FIG. 9 illustrates what the user experiences when he or she utilises the mobile payment terminal to make a contactless payment.

In FIG. 8, the operation 800 starts for instance when the mobile payment terminal 100 is off in State 1 801. In a step 802, the mobile payment terminal 100 processor 501 determines if the terminal "power on" button 206 is pressed. If terminal "power on" button 206 press is not detected, the mobile payment terminal 100 remains off in State 1. If terminal "power on" button 206 press is detected, the mobile payment terminal 100 enters State 2, "Standby" mode, in a step 803. In this step, the processor 501 controls the terminal display interface 104 to turn on and the LCD 509 to display information. The information displayed may contain operating instructions, for instance the instructions "Turn dial to select payment amount", and a default minimum spend amount "XX". In this step, the processor 501 also controls the backlit LEDs 513 in the LCD 509 to illuminate the display in a colour, for instance the colour red. The data on display is advantageously illuminated in the chosen colour to indicate to the user that the mobile payment terminal is in a particular state, for instance in "Standby" state, ready to receive user input. This reduces the possibility that the user may think that he or she has erroneously made a contactless payment during operation.

In a step 804, the processor 501 determines whether or not the scrollable dial 101 is operated by a user. If rotation of the scrollable dial 101 is not detected, the mobile payment terminal 100 remains in State 2. If rotation of the scrollable dial 101 is detected, the processor 501 triggers a time out A timer to start counting in a step 805. The time out period for time out A timer may for instance be set at 10 seconds. This feature provides a user with an option to "cancel" or terminate the transaction if the user changes his or her mind. Once time out A timer is started, in a step 806, the processor 501 controls the LCD 509 to display the present data representation of a payment amount selected by the user using the scrollable dial 101, incrementing from the minimum "XX" spend value. The payment value is constantly updated by the processor 501 on the LCD 509 as the scrollable dial 101 is turned by the user, allowing the user to know what the payment amount is currently set at. In this step, the processor 501 also controls the LCD 509 to display further operating instructions, for instance the instructions "Press dial to confirm payment amount".

In a step 807, the processor 509 determines whether or not the scrollable dial is depressed. If the scrollable dial 101 is not depressed, the processor determines if the scrollable dial 101 is being rotated in a step 814. On a positive determination in step 814, the processor resets the time out A timer in a step 815 and returns to step 806. This loop will repeat as long as the user is scrolling the scrollable dial 101 to set a desired payment amount. Resetting the time out A timer in step 815 ensures that while the user is setting the desired payment amount, the contactless payment transaction does not time out prematurely. On a negative determination in step 814, the processor proceeds to determine if the time out A timer has timed out in a step 816. On a positive determination in step 816, the processor 501 controls the mobile payment terminal 100 to return to State 2 in step 803. The time out A timer is introduced in step 805 advantageously as a safety feature to ensure that if the user changes his or her mind on making a contactless payment mid way through scrolling the scrollable dial 101 and walks away, the last amount set by the user is reset and the mobile payment terminal 100 returns to "Standby" state. This reduces the possibility of another user being erroneously charged if he or she is in close proximity to the mobile payment terminal 100. On a negative determination in step 816, the processor returns to step 814 to determine if the scrollable dial has been turned.

In step 807, if the processor 501 determines that the scrollable dial 101 is depressed, it controls the mobile payment terminal 100 to enter State 3, "Payment" mode, in a step 808. In this step, the processor 501 controls the short distance contactless radio frequency interface 103 to turn on while keeping the terminal display interface 104 turned on. In this step the processor 501 also controls the backlit LEDs 513 in the LCD 509 to illuminate the display in another colour, for instance the colour green. The data on display is advantageously illuminated in the chosen colour to indicate to the user for instance that the mobile payment terminal has acknowledged the desired payment amount set by the user. This reduces the possibility that the user may think that he or she has erroneously made a contactless payment during operation. The processor 501 also controls the LCD 509 to status information, for instance the information "Terminal ready to receive contactless payment". The processor 501 further controls the LEDs 505 to illuminate the contactless payment indicator logo 111 located on the housing of the short distance contactless radio frequency interface 103. This advantageously directs the user to present his or her contactless payment device in close proximity to the short distance contactless radio frequency interface 103 to facilitate a contactless payment transaction.

In a step 809, the processor proceeds to trigger time out B timer to start counting. The time out period for time out B timer may for instance be set at 5 seconds. Again, this feature provides the user with an option to "cancel" or terminate the transaction if the user changes his or her mind. At this step, a countdown timer may be displayed on the LCD to indicate to the user how much time he or she has remaining to complete the payment transaction before the transaction is "cancelled". In a step 810, the processor 501 detects whether a contactless payment device is within a threshold proximity to the short distance contactless radio frequency interface 103. The threshold proximity between the contactless payment device and the short distance contactless radio frequency interface 103 may for instance be below 20 mm. If the processor 501 detects a contactless payment device to be within the proximity threshold, the contactless payment transaction proceeds to a step 811.

In a step 811, the processor 501 controls the card reader 514 within the short distance contactless radio frequency interface 103 to extract perform authentication with and communicate relevant data with the contactless payment device ideally in the usual manner of contactless payment transactions. In this step, the processor 501 also collects all the relevant information of the present contactless payment transaction, for instance, the time of transaction, the payment amount, security data received from the contactless payment device etc. and stores this information in the main memory 503 to be processed at a later time. In this step, the processor 501 also controls the LCD 509 to display status information, for instance the information "Transaction in Progress".

In this embodiment, the mobile payment terminal is advantageously a polled terminal. A polled terminal processes and stores accepted contactless payment transactions throughout the day, and then transmit their details to an acquirer using a telephone connection established between the mobile payment terminal 100 and an acquirer owned terminal at night. This kind of system can also be referred to as a predominantly off-line terminal or a POT.

In a step 817, the processor 501 determines if the off-line payment transaction is complete. On a negative determination, the contactless payment transaction process returns to step 811. On a positive determination, the processor 501 controls the mobile payment terminal 100 to enter State 4, "End" state. In this step, the processor 501 controls the short distance contactless radio frequency interface 103 to turn off while keeping the terminal display interface 104 turned on. The processor 501 also controls the LCD 509 to display status information, for instance the information "Transaction Completed". This is to alert the user that the payment transaction is complete. The processor 501 also controls the tone generator 512 to play a "beep" tone as an audio cue to indicate that the payment transaction is complete. Finally, the processor 501 controls the mobile payment terminal 100 to return to step 801 and enter State 2. In State 2, the mobile payment terminal 100 returns to "Standby" mode and remains in this state ready to process the next payment transaction.

The flow chart in FIG. 9 illustrates what the user experiences when he or she utilises the mobile payment terminal to make a contactless payment. When a decision to make a contactless payment is made in a step 901, the user begins by reading the operating instructions presented on the terminal display interface 104 LCD 509, for instance the instructions "Turn dial to select payment amount" in a step 902. In this step, the user is also presented with a minimum payment amount XX on the LCD 509. The LCD 509 is also illuminated in a colour, for instance the colour red in this step.

In a step 903, the user begins to rotate the scrollable dial 101, for instance in a clockwise direction to increase a desired payment amount from "XX". As the scrollable dial 101 is being rotated, the present payment amount set by the user is displayed on the terminal display interface 104 LCD 509. This value is updated on the LCD 509 at a refresh rate of 200 ms. This ensures that while the scrolling dial 101 is being rotated, the user is presented with the most current intended payment amount. In this step, the user is also presented with further operating instructions, for instance the instructions "Press dial to confirm payment amount". This ensures that the user is informed of what he or she is required to do next after he or she completes setting the desired payment amount.

Once the desired payment amount is set by the user, in a step 904, the user depresses the scrollable dial 101 to confirm the amount on the mobile payment terminal 101. Upon detecting the payment amount confirmation via the scrollable dial 101 button press, the illumination on the LCD 509 changes colour, for instance to the colour green. This advantageously indicates to the user that the mobile payment terminal 100 acknowledges the payment amount confirmation. In this step, the user is also presented with status information, for instance the information "Terminal ready to receive contactless payment".

In a next step 905, the user sees the contactless payment indicator logo 111 located on the housing of the short distance contactless radio frequency interface 103 light up to indicate to the user that the mobile payment terminal is ready to proceed with the contactless payment transaction. In this step, in conjunction with the contactless payment indicator logo 111 lighting up, user may also see on the LCD 509 may display of a timer, for instance counting down from Y seconds. Advantageously, this can be used to give an indication to the user how much time he or she presently has left to present a contactless payment device to the short distance contactless radio frequency interface 103. In a step 906, the user presents the contactless payment device, for instance, a contactless payment card to the short distance contactless radio frequency interface 103.

Upon detection of the contactless payment device by the mobile payment terminal 100, the user is presented with further status information, for instance the information "Transaction in progress" in a step 907. In this step, upon completion of the "off-line" payment transaction, the user is presented with yet further status information, for instance the information "Transaction completed". In this step, the user sees the illumination on the LCD 509 also change colour, for instance to the colour red to indicate to the user that the payment transaction is complete. Finally, in step 908, the user witnesses the mobile payment terminal also emit for instance a "beep" tone as an audio cue via the tone generator 512 as an alternative indicator to the user that the contactless payment transaction is complete.

FIG. 8 and FIG. 9 above relates to the operation of the mobile payment terminal 100 as in FIG. 1 and the user's experience when operating the mobile payment terminal 100 as in FIG. 1 respectively. The flowcharts in FIGS. 8 and 9 can equally be applied to the mobile payment terminal 300 and the mobile payment terminal 400 in FIG. 3 and FIG. 4 respectively.

When applying the flowchart in FIG. 8 to describe the operation of the mobile payment terminal 300 in FIG. 3, in step 803, the operating instructions displayed on the LCD 509 may for instance read "Slide adjuster to select payment amount". In steps 804 and 814 the flowchart should for instance read "Adjuster knob adjusted" instead of "Scroll dial turned". In step 807 the flowchart should for instance read "Adjuster knob pressed" instead of "Scroll dial pressed". In step 806, the operating instructions displayed on the LCD 509 may for instance read "Press adjuster knob to confirm payment amount".

When applying the flowchart in FIG. 9 to describe the user's experience when using the mobile payment terminal 300 in FIG. 3, in step 902, the user should read "Slide adjuster to select payment amount". In step 903, the user should read "Press adjuster knob to confirm payment amount".

When applying the flowchart in FIG. 8 to describe the operation of the mobile payment terminal 400 in FIG. 4, in step 803, the operating instructions displayed on the LCD 509 may for instance read "Adjust –/+ buttons to select payment amount". In steps 804 and 814 the flowchart should for instance read "–/+ buttons pressed" instead of "Scroll dial turned". In step 807 the flowchart should for instance read "OK button pressed" instead of "Scroll dial pressed". In step 806, the operating instructions displayed on the LCD 509 may for instance read "Press OK button to confirm payment amount".

When applying the flowchart in FIG. 9 to describe the user's experience when using the mobile payment terminal 300 in FIG. 3, in step 902, the user should read "Adjust –/+ buttons to select payment amount". In step 903, the user should read "Press OK button to confirm payment amount".

The scrollable dial 101 outer surface 106 of the mobile payment terminal 100 may be textured and coated with or formed of a rubberised material. The advantage of this is to provide mechanical advantage or grip for the user when the scrollable dial 101 is manipulated.

The scrollable dial 101 may also comprise a resilient spring use to apply variable force on the scrollable dial 101 when it is being rotated. The advantage of this is that it provides useful feedback to the user during operation of the scrollable dial 101.

The scrollable dial 101 may also comprise a variable input mean such that its output, for instance a resistance value, to the processor 501 varies in a non-linear fashion when the scrollable dial 101 is rotated. An advantage of this is that the mobile payment terminal 100 can be operated such that when the user is setting the desired payment on the terminal, the payment incremental steps can be varied depending on the rotation angle displacement of the scrollable dial 101 from its original position. Here, the greater the displacement from the centre point, the further the rate of change of the payment value that is displayed before selection. This allows the user to very quickly arrive at the desired payment amount setting.

The mobile payment terminal 100 may be realised such that it can be operated wirelessly with a base station located in the restaurant premises within a fixed radius. The base station will comprise a network communication interface to connect to an acquirer owned terminal via for instance a fixed line telephone or land line. In this embodiment, the transfer of payment transaction information from the merchant/retailer to the acquirer is carried out centrally by the base station only at the end of the day. The advantage of this is that the mobile payment terminal 100 can be simplified and will not require a network communication interface 504, saving cost and complexity. Further, if multiple mobile payment terminals 100 are being used at the same time, multiple dial-in to the acquirer which could lead to connection issues and hence delay to the payment process, can be avoided.

In further embodiments, the mobile payment terminal 100 may also print out a hard copy receipt of the contactless payment transaction for the user as reference. The receipt may contain payment transaction information, for instance an identity of the merchant, the payment amount and a time stamp of the transaction.

Alternatively or in addition, the mobile payment terminal 100 may provide a digital receipt of the contactless payment transaction to the user. For instance, the mobile payment terminal 100 may be equipped with NFC facilities to allow a Bluetooth connection to be established between the mobile payment terminal 100 and the contactless payment devices provided by the user such as a mobile phone. Once connection is established, the digital receipt can then be sent wireless from the mobile payment terminal 100 to the mobile phone.

The invention claimed is:

1. A payment terminal comprising:
    a contactless payment transceiver;
    a display; and
    user input apparatus comprising a select input, an increase input and a decrease input,
    wherein the payment terminal is configured to:
        display an initial numerical value;
        respond to detecting user operation of the increase input by incrementing the numerical value displayed on the display;
        respond to detecting user operation of the decrease input by decrementing the numerical value displayed on the display;
        respond to detection of user operation of the select input by setting a transaction amount that corresponds to the numerical value displayed on the display at the time of detection of user operation of the select input; and
        use the contactless payment transceiver to initiate execution of a transaction for the transaction amount with a contactless payment token;
    wherein the input device comprises a dial device configured to be rotated by a user in clockwise and anticlockwise directions around a zero position, and wherein the increase input and the decrease input comprise means for detecting deflection of the dial from the zero position in different directions respectively, wherein the payment terminal is configured to control the rate of incrementing and decrementing the numerical value depending on a detected amount of deflection of the dial device from the zero position and wherein the select input comprises means for detecting displacement of the dial in a direction that is substantially perpendicular to the plane of rotation of the dial.

2. A payment terminal as claimed in claim 1, wherein the dial device is mechanically biased to the zero position such that the aspect of the input device returns to the zero position in the absence of applied force.

3. A payment terminal as claimed in claim 1, wherein the increase input comprises means for detecting deflection of the dial from the zero position in the clockwise direction and the decrease input comprises means for detecting deflection of the dial from the zero position in the anticlockwise direction.

4. A payment terminal as claimed in claim 1, wherein the dial device has a textured outer surface.

5. A payment terminal as claimed in claim 1, wherein the dial device has a rubberised outer surface.

6. The payment terminal according to claim 1, wherein the payment terminal is further configured to control the rate of incrementing and decrementing the numerical value depending on a sensitivity of the dial device, wherein in an initial state of the dial device the sensitivity is in a high state resulting in an initial unit of change in the numerical value based on the detected amount of deflection, and wherein the sensitivity of the dial device reduces as the numerical value increases resulting in a unit change in the numerical value that is greater than the initial unit of change.

7. A method of operating a payment terminal,
    the payment terminal comprising: a contactless payment transceiver; a display; and user input apparatus comprising a select input, an increase input and a decrease input,
    wherein the input device comprises a dial device configured to be rotated by a user in clockwise and anticlockwise directions around a zero position, and wherein the increase input and the decrease input comprise means for detecting deflection of the dial from the zero position in different directions respectively, and wherein the select input comprises means for detecting displacement of the dial in a direction that is substantially perpendicular to the plane of rotation of the dial,
    wherein the method comprises:
        displaying an initial numerical value;
        responding to detecting user operation of the increase input by incrementing the numerical value displayed on the display;
        responding to detecting user operation of the decrease input by decrementing the numerical value displayed on the display;
        controlling the rate of incrementing and decrementing the numerical value depending on a detected amount of deflection of the dial device from the zero position;
        responding to detection of user operation of the select input by setting a transaction amount that corresponds to the numerical value displayed on the display at the time of detection of user operation of the select input; and
        using the contactless payment transceiver to initiate execution of a transaction for the transaction amount with a contactless payment token.

8. The method according to claim 7, wherein the method further includes the payment terminal controlling the rate of incrementing and decrementing the numerical value depending on a sensitivity of the dial device, wherein in an initial state of the dial device the sensitivity is in a high state resulting in an initial unit of change in the numerical value based on the detected amount of deflection, and wherein the sensitivity of the dial device reduces as the numerical value increases resulting in a unit change in the numerical value that is greater than the initial unit of change.

9. A payment terminal comprising:
a contactless payment transceiver;
a display; and
user input apparatus comprising a select input, an increase input and a decrease input,
wherein the payment terminal is configured to:
display an initial numerical value;
respond to detecting user operation of the increase input by incrementing the numerical value displayed on the display;
respond to detecting user operation of the decrease input by decrementing the numerical value displayed on the display;
respond to detection of user operation of the select input by setting a transaction amount that corresponds to the numerical value displayed on the display at the time of detection of user operation of the select input; and
use the contactless payment transceiver to initiate execution of a transaction for the transaction amount with a contactless payment token,
wherein the user input apparatus comprises an input device having an aspect that can be moved by a user to positions either side of a zero position and is mechanically biased to the zero position such that the aspect of the input device returns to the zero position in the absence of applied force, and wherein the payment terminal is configured to control the rate of incrementing and decrementing the numerical value depending on a detected amount of deflection of the aspect of the input device from the zero position.

10. A payment terminal as claimed in claim 9, wherein the input device comprises a dial device configured to be rotated by a user in clockwise and anticlockwise directions around a zero position, and wherein the increase input and the decrease input comprise means for detecting deflection of the dial from the zero position in different directions respectively.

11. The payment terminal according to claim 9, wherein the payment terminal is further configured to control the rate of incrementing and decrementing the numerical value depending on a sensitivity of the dial device, wherein in an initial state of the dial device the sensitivity is in a high state resulting in an initial unit of change in the numerical value based on the detected amount of deflection, and wherein the sensitivity of the dial device reduces as the numerical value increases resulting in a unit change in the numerical value that is greater than the initial unit of change.

12. A payment terminal as claimed in claim 10, wherein the increase input comprises means for detecting deflection of the dial from the zero position in the clockwise direction and the decrease input comprises means for detecting deflection of the dial from the zero position in the anticlockwise direction.

13. A payment terminal as claimed in claim 10, wherein the select input comprises means for detecting displacement of the dial in a direction that is substantially perpendicular to the plane of rotation of the dial.

14. A payment terminal as claimed in claim 10, wherein the dial device has a textured outer surface.

15. A payment terminal as claimed in claim 10, wherein the dial device has a rubberised outer surface.

16. A payment terminal as claimed in claim 9, wherein the aspect comprises a slider that can be moved by a user to positions either side of the zero position, and wherein the increase input and the decrease input comprise means for detecting deflection of the slider from the zero position in different directions respectively.

* * * * *